United States Patent
Zhang et al.

(10) Patent No.: US 12,402,079 B2
(45) Date of Patent: Aug. 26, 2025

(54) SYSTEM AND METHOD FOR CLOSED-LOOP UPLINK POWER CONTROL

(71) Applicant: Apple Inc., Cupertino, CA (US)

(72) Inventors: Yushu Zhang, Beijing (CN); Chunhai Yao, Beijing (CN); Chunxuan Ye, San Diego, CA (US); Dawei Zhang, Saratoga, CA (US); Fangli Xu, Beijing (CN); Haijing Hu, Beijing (CN); Haitong Sun, Cupertino, CA (US); Hong He, Cupertino, CA (US); Oghenekome Oteri, San Diego, CA (US); Shu Guo, Beijing (CN); Wei Zeng, San Diego, CA (US); Weidong Yang, San Diego, CA (US); Yuchul Kim, Santa Clara, CA (US); Yuqin Chen, Shenzhen (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 433 days.

(21) Appl. No.: 17/912,470

(22) PCT Filed: Apr. 8, 2020

(86) PCT No.: PCT/CN2020/083679
§ 371 (c)(1),
(2) Date: Sep. 16, 2022

(87) PCT Pub. No.: WO2021/203273
PCT Pub. Date: Oct. 14, 2021

(65) Prior Publication Data
US 2023/0156607 A1    May 18, 2023

(51) Int. Cl.
*H04W 52/08*    (2009.01)
*H04W 52/14*    (2009.01)
(Continued)

(52) U.S. Cl.
CPC ......... *H04W 52/08* (2013.01); *H04W 52/146* (2013.01); *H04W 72/1268* (2013.01); *H04W 76/10* (2018.02)

(58) Field of Classification Search
CPC  H04W 52/08; H04W 72/232; H04W 72/0446
See application file for complete search history.

(56) References Cited

U.S. PATENT DOCUMENTS

2013/0114562 A1    5/2013  Seo
2022/0330163 A1*  10/2022  Liu ...................... H04W 52/146

FOREIGN PATENT DOCUMENTS

CN    103843423    6/2014
CN    105874863    8/2016
(Continued)

OTHER PUBLICATIONS

International Search Report and Written Opinion for PCT Patent Application No. PCT/CN2020/083679; 9 pages; 12/30/220.
(Continued)

*Primary Examiner* — Tu X Nguyen
(74) *Attorney, Agent, or Firm* — Kowert, Hood, Munyon, Rankin & Goetzel, P.C.

(57) ABSTRACT

Embodiments are presented herein of apparatuses, systems, and methods for a user equipment device (UE) and a network to perform closed-loop transmission power control in a multi-base station environment with out-of-order scheduling. The network may configure a series of transmission power control commands to indicate to the UE transmission power for one or more transmissions to different base stations. The UE may receive the transmission power control commands, consider information including timing and/or resources associated with the transmission power control commands, and determine transmission power for the transmissions.

18 Claims, 12 Drawing Sheets

(51) Int. Cl.
*H04W 72/1268* (2023.01)
*H04W 76/10* (2018.01)

(56) References Cited

FOREIGN PATENT DOCUMENTS

| | | |
|---|---|---|
| CN | 106102150 | 11/2016 |
| CN | 109391975 | 2/2019 |
| CN | 110383904 | 10/2019 |
| CN | 110536394 | 12/2019 |
| EP | 3952484 | 9/2022 |
| WO | 2018136691 | 7/2018 |

OTHER PUBLICATIONS

Institute for Information Industry (III) "Power control for multi-TRP uplink transmission"; 3GPP TSG RAN WG1 Meeting #97 R1-1907372; Reno, USA; 5 pages; May 13, 2019.
Office Action for CN 202080099530.X; Mar. 26, 2025.
Extended European Search Report for EP Application No. 20929758.9; Apr. 28, 2023.
CATT "Remaining Issues of Non-CA Based Power Control"; 3GPP TSG RAN WG1 Meeting #93 R1-1806303; May 21, 2018.

\* cited by examiner

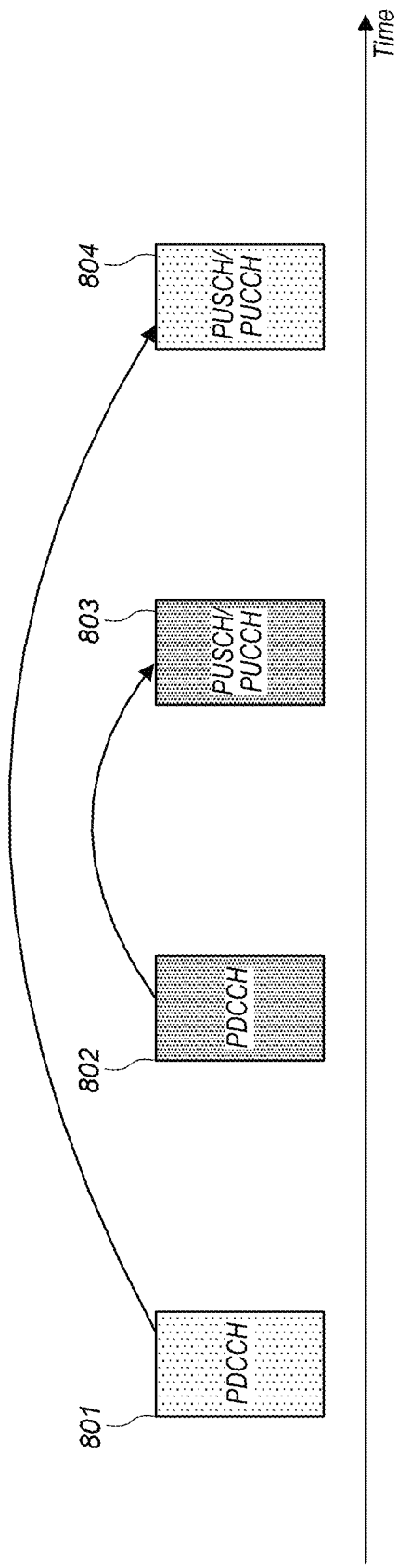
FIG. 8 – Prior Art
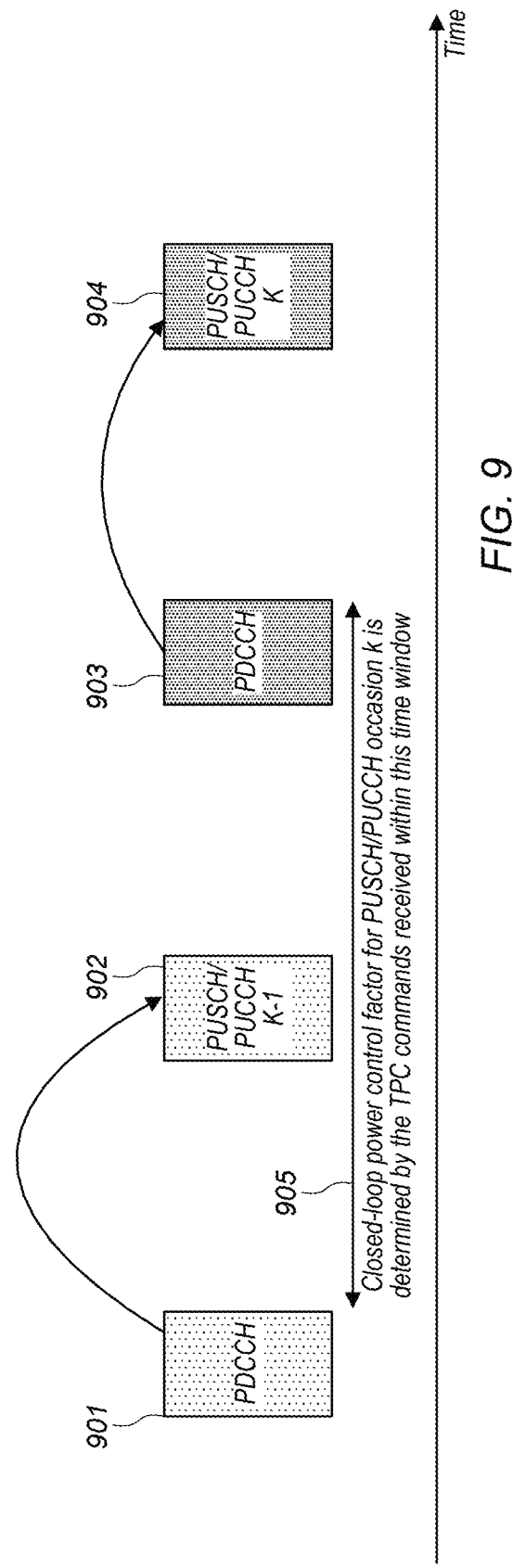
FIG. 9

SYSTEM AND METHOD FOR CLOSED-LOOP UPLINK POWER CONTROL

PRIORITY CLAIM

This application is a national phase entry of PCT application number PCT/CN2020/083679, entitled "System and Method for Closed-loop Uplink Power Control," filed Apr. 8, 2020, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless devices, and more particularly to apparatuses, systems, and methods for closed-loop uplink power control.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics.

One issue in wireless communication includes uplink power control, e.g., a network and/or base station providing information to a user equipment device (UE) indicating a transmission power level to be used for one or more uplink transmissions. One form of uplink power control may include closed-loop uplink power control. In scenarios including multiple transmission/reception points, out-of-order (e.g., unordered) scheduling may occur (e.g., transmission power control commands may be transmitted in an order that is independent of the order of uplink transmissions to which the commands apply), and thus ambiguity in power control may arise. Accordingly, improvements in the field may be desired.

SUMMARY

Embodiments are presented herein of, inter alia, systems, apparatuses, and methods for a wireless device and a network performing closed-loop uplink power control.

In some embodiments, a network may schedule uplink communications from a user equipment device (UE) to one or more base stations and configure a series of transmission power control commands to indicate transmission power level(s) for the UE to use for the uplink communications. The transmission power control commands may be transmitted from one or more base stations. The UE may receive the transmission power control commands and may determine respective subsets of the commands to apply to determining transmission power for respective uplink transmissions. The UE may transmit the uplink transmissions to the base stations using the determined transmission power levels.

The techniques described herein may be implemented in and/or used with a number of different types of devices, including but not limited to cellular phones, tablet computers, accessory and/or wearable computing devices, portable media players, vehicles, access points and other wireless local area network equipment, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description is considered in conjunction with the following drawings, in which:

FIGS. 8-15 illustrate aspects of closed-loop power control, according to some embodiments.

Figure 1:
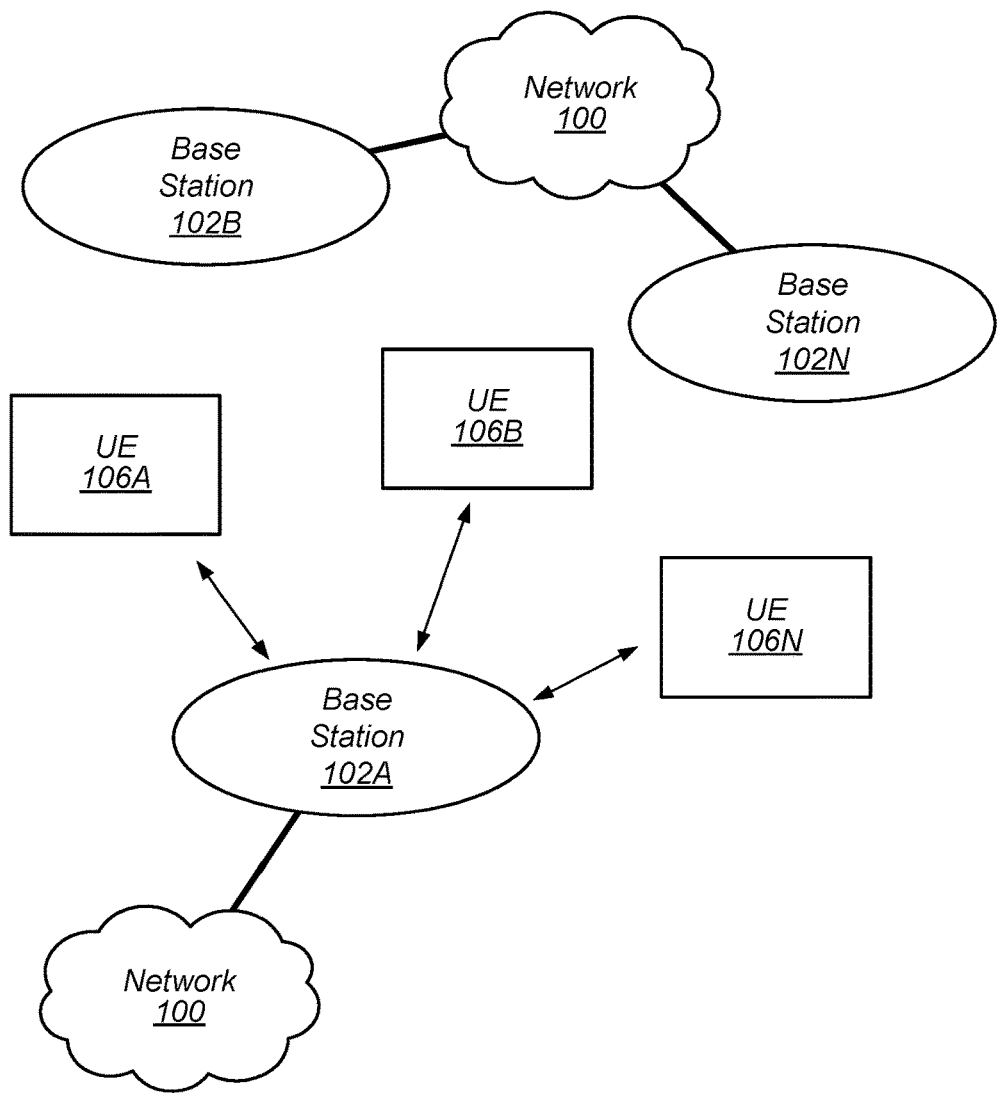
FIG. 1 illustrates an example wireless communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Terms

The following is a glossary of terms used in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™ Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, vehicle, automobile, unmanned aerial vehicles (e.g., drones) and unmanned aerial controllers, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device. A communication device may be referred to as a station or STA.

Base Station or Access Point (AP)—The term "Base Station" has the full breadth of its ordinary meaning, and at least includes a wireless communication station installed at a fixed location and used to communicate as part of a wireless telephone system or radio system. The term "access point" is used similarly.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network. Wi-Fi or WLAN may refer to technology based on IEEE 802.11 wireless standards such as 802.11a, 802.11.b, 802.11g, 802.11n, 802.11-2012, 802.11ac, 802.11ax, 802.11he, 802.11ad, 802.11.ax, 802.11ay, 802.11az, and/or other IEEE 802.11 standards.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
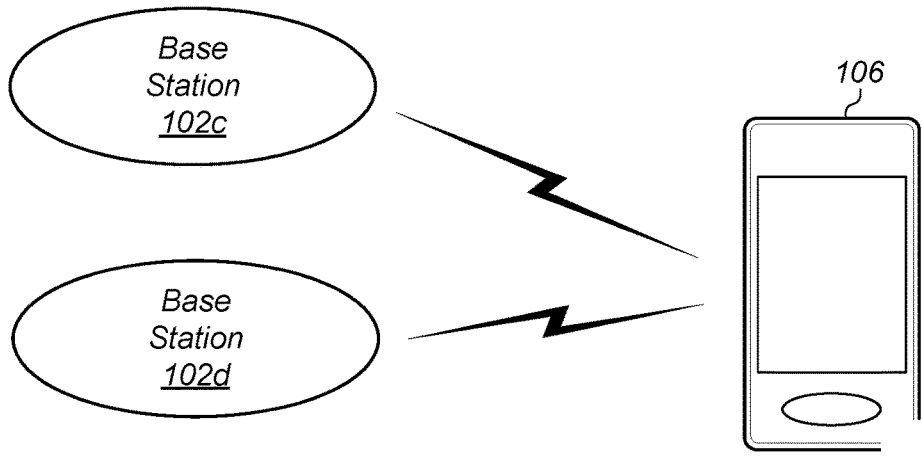
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with base stations 102c and 102d, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, traces, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102c and/or BS 102d may also include any number of antennas and may be configured to use the antennas to transmit and/or receive directional wireless signals (e.g., beams). To receive and/or transmit such directional signals, the antennas of the UE 106 and/or BS 102c and/or BS 102d may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
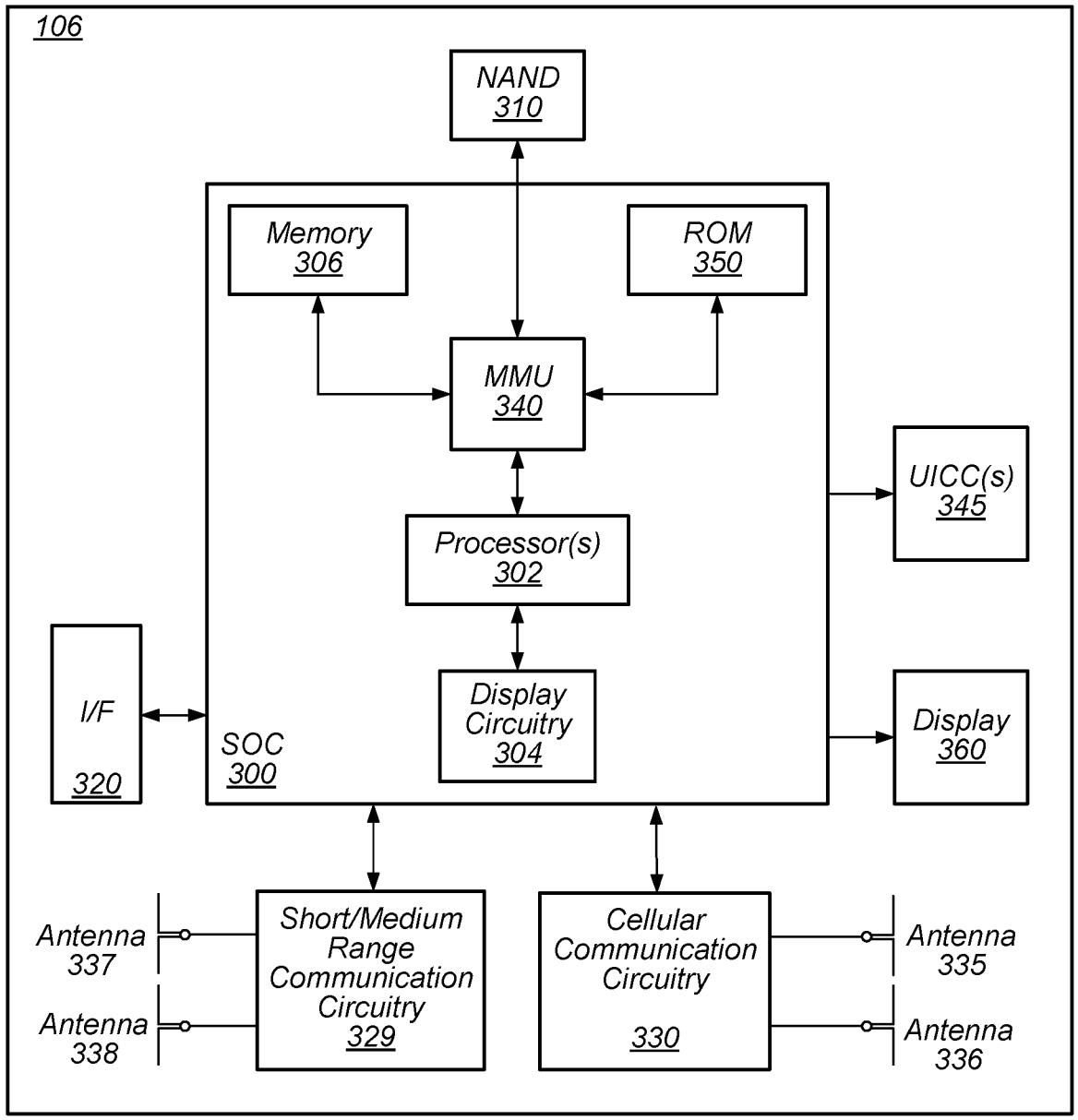
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains for multiple RATs (e.g., a first receive chain for LTE and a second receive chain for 5G NR). Such receive chains may include and/or be communicatively coupled (e.g., directly or indirectly) to dedicated processors and/or radios. In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements/processors may be included in cellular communication circuitry 330 and, similarly, one or more processing elements/processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
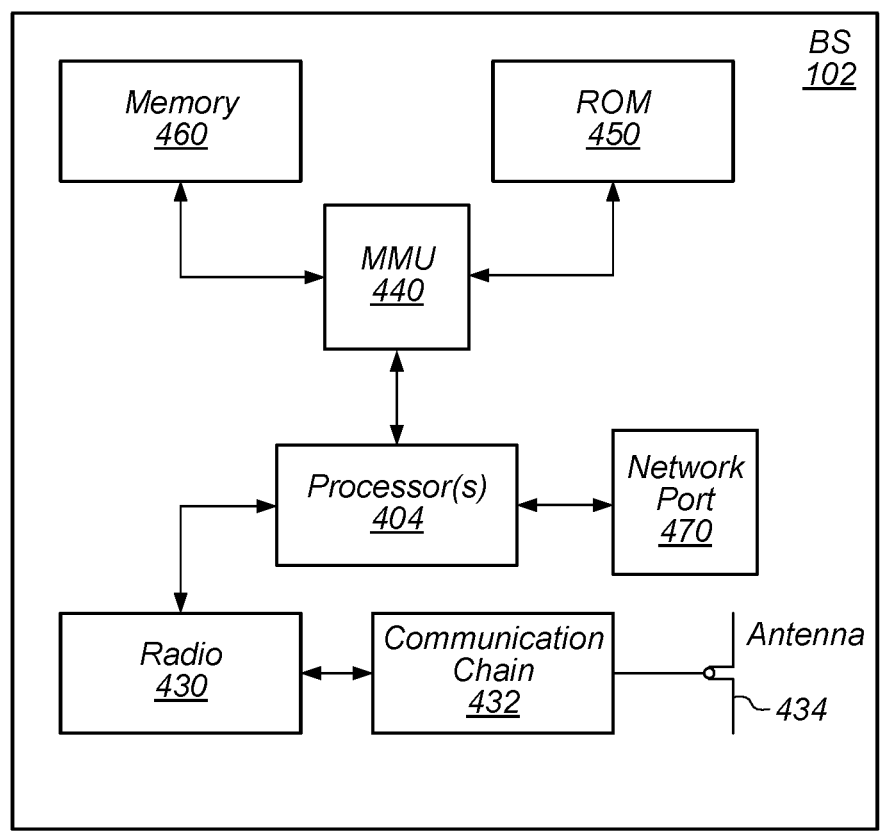
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
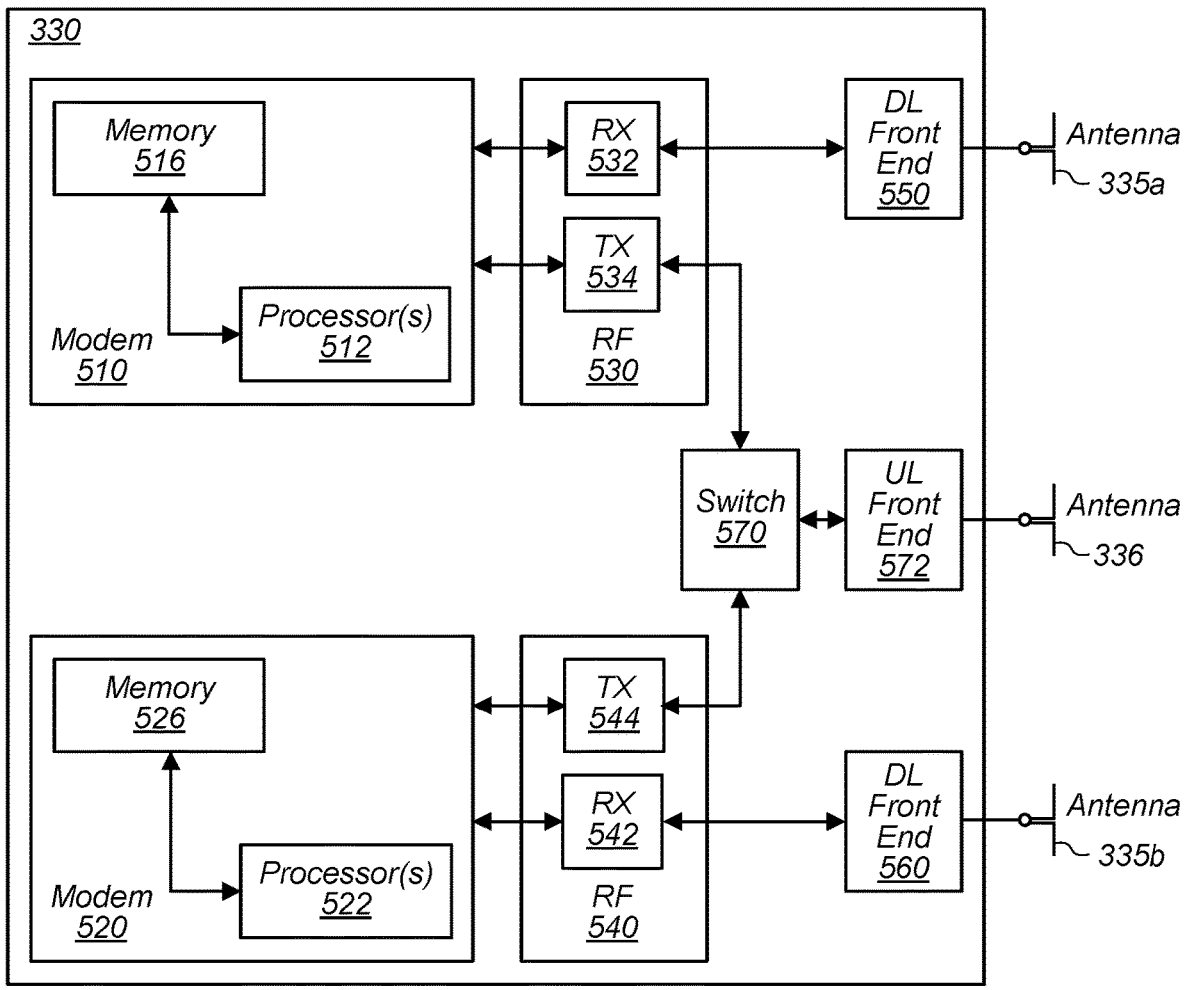
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a*-*b* and 336 as shown (in FIG. 3). In some embodiments, cellular communication circuitry 330 may include dedicated receive chains for multiple RATs (e.g., a first receive chain for LTE and a second receive chain for 5G NR). Such receive chains may include and/or be communicatively coupled (e.g., directly or indirectly) to dedicated processors and/or radios. For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
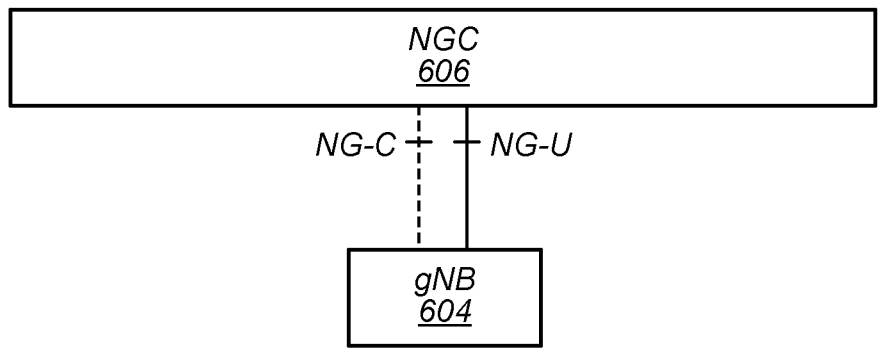
FIGS. 6 and 7 illustrate examples of a 5G NR base station (gNB), according to some embodiments.
Figure 7:
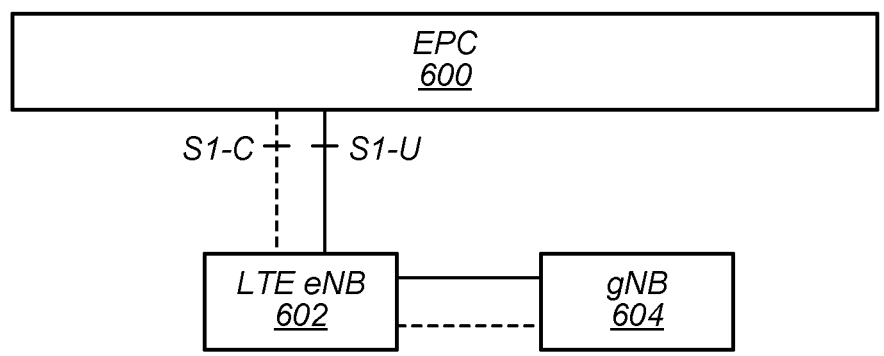
Figure 10:
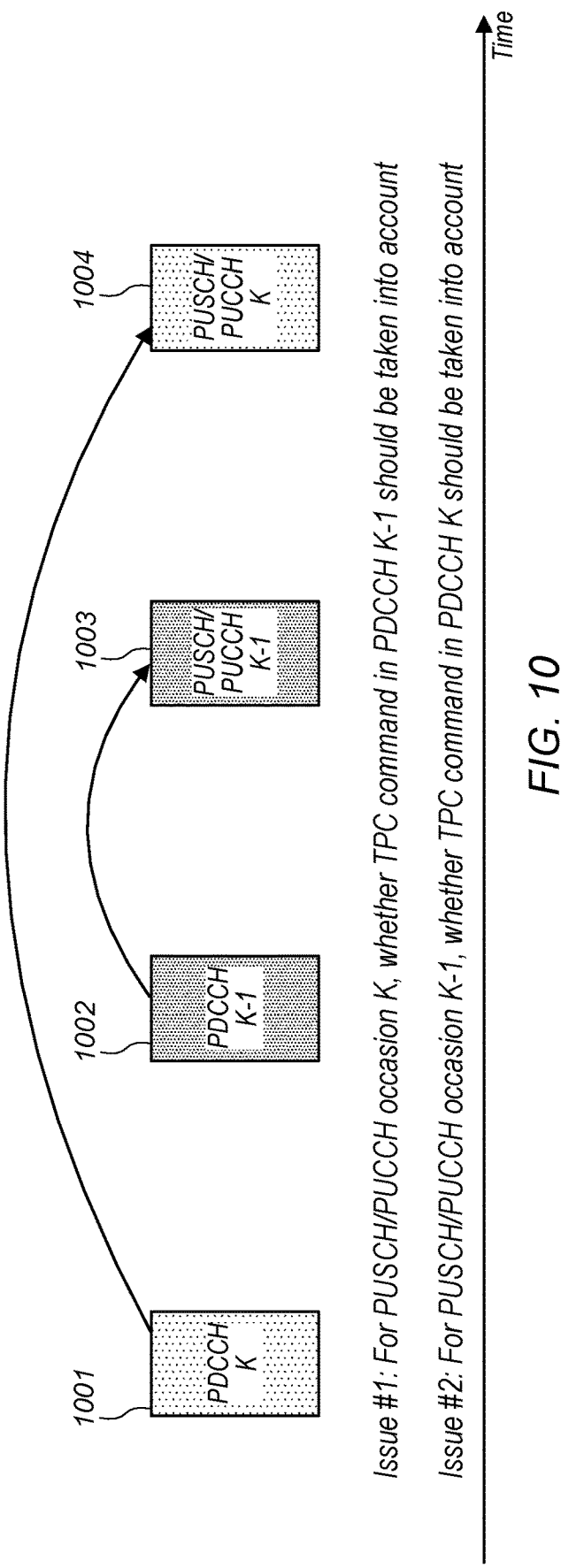

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

FIGS. 8-15—Closed-Loop Uplink Power Control

In a closed-loop uplink power control scheme, a receiver (e.g., a base station such as BS 102 and/or transmit/receive point (TRP)) may measure one or more characteristics (e.g., received power, signal-to-noise, etc.) of an uplink transmission received from a transmitter (e.g., a UE such as UE 106). The measured characteristics may include any of signal-noise ratio (SNR), signal to interference and noise ratio (SINR), reference signal received power (RSRP), reference signal received quality (RSRQ), received signal strength indicator (RSSI), channel quality indicator (CQI), channel state information (CSI), block error rate (BLER), bit error rate (BER), channel impulse response (CIR), channel error response (CER), etc. Based on the characteristics of the received signal, the receiver may transmit a transmit power control (TPC) command to the transmitter. The transmitter may use one or more TPC command to determine a transmit power to use for one or more subsequent transmissions to the BS or TRP.

In various wireless communication systems, e.g., such as 3GPP Release-16, operation with multiple streams of downlink control information (DCI) (e.g., multi-DCI) associated with multiple respective transmit/receive points (TRP) may be supported. Such multi-DCI, multi-TRP operation may be supported for gNBs or other base stations with ideal backhaul (e.g., low latency, high throughput, e.g., less than 2.5 μs latency and throughput greater than 100 Mbps, among various possibilities) or non-ideal backhaul (e.g., higher latency and/or lower throughput). Multi-TRP operation may include different TRPs exchanging data (e.g., simultaneously or concurrently, e.g., using time division and/or frequency division multiplexing, etc.) with a UE. The different TRPs may be associated with different control resource sets (CORESETs) for uplink and downlink transmissions.

For non-ideal backhaul, the scheduling may be based on an (e.g., potentially) out-of-order manner as illustrated in FIG. 8. It will be appreciated that in-order scheduling may also be supported, according to some embodiments. As used herein, out-of-order scheduling may refer to unordered scheduling, e.g., an order of a series of downlink control information (DCI) transmissions related to a series of uplink transmissions may not be related to (e.g., potentially the same as or different from) the order of the uplink transmissions. As shown, a first physical downlink control channel (PDCCH) 801 may be transmitted in a slot n and a second PDCCH 802 may is transmitted in slot n+k (k>0). The PDCCH 801 and 802 may contain downlink control information (DCI), e.g., which may be associated with different TRPs (e.g., BS 102c and/or BS 102d, as illustrated in FIG. 2). Among various possibilities, the DCI may schedule resources for uplink transmissions to one or more TRP and/or include TPC for such uplink transmissions. In some embodiments, PDCCH transmitted on one CORESET may provide DCI corresponding to uplink transmissions (e.g., using the same CORESET). For example, PDCCH from one TRP may schedule and/or control uplink transmissions (e.g., physical uplink control channel (PUCCH) and/or physical uplink shared channel (PUSCH)) to that TRP, e.g., using the same CORESET. This may be allowed when two different CORESETs (e.g., potentially identified by different poolIndex) are configured in the CORESETs carrying PDCCH which may include scheduling information. Any number of CORESETs may share a common CORESET-poolIndex value. However, it will be appreciated that one TRP may provide DCI for transmissions to another TRP, according to some embodiments.

In the illustrated example, a first uplink transmission (e.g., PUSCH and/or PUCCH 804) corresponding to the first PDCCH may be transmitted in slot m+x (m>n, x>0) and a second uplink transmission (e.g., PUSCH and/or PUCCH 803) corresponding to the second PDCCH may be transmitted in slot m.

In various wireless communication systems, e.g., such as 3GPP Release-15, accumulative closed-loop power control may be supported. The power control may be adjusted by TPC commands, e.g., carried by DCI. An example of accumulative closed-loop power control is shown in FIG. 9. For PUSCH and/or PUCCH transmission occasion K (904), the accumulative closed-loop power control factor may be determined based on the sum of TPC command(s) between the scheduling PDCCH (901) of PUSCH and/or PUCCH transmission occasion K-1 (902) and the scheduling PDCCH (903) of PUSCH and/or PUCCH transmission occasion K (904). In other words, all TPC commands received in time window 905, extending from the end of PDCCH 910 to the end of PDCCH 903 may be used to adjust the transmit power of PUSCH/PUCCH in occasion K, 904.

For multi-DCI based multi-TRP operation, e.g., when different CORESET-poolIndex values are configured for different CORESETs and a UE is scheduled in out-of-order scheduling manner, it may be unclear how to determine the closed-loop power control factor for different PUSCH/ PUCCH transmission occasions. Using the example of FIG. 10, two issues may be:

For PUSCH and/or PUCCH occasion K (1004), whether the TPC command(s) in PDCCH associated with K−1 (1002) should be considered; and For PUSCH and/or PUCCH occasion K−1 (1003), whether the TPC command(s) in PDCCH associated with K (1001) should be considered.

Figure 11:
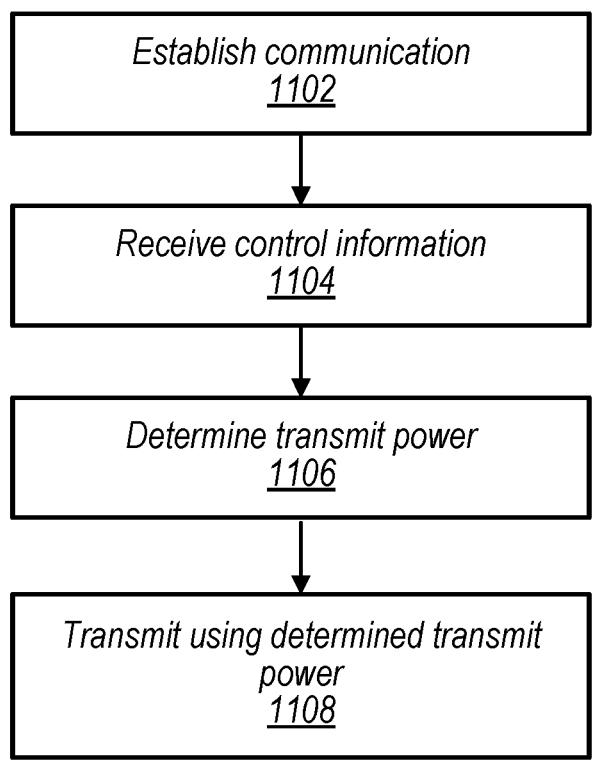

Accordingly, improved methods for closed-loop uplink power control communication may be desired. FIG. 11 illustrates exemplary techniques for performing closed-loop power control for uplink transmission, according to some embodiments. Aspects of the method of FIG. 11 may be implemented by a wireless device, such as the UE 106, in communication with a network 100 and one or more base stations 102 as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) (e.g., processor(s) 302, 404, 512, 522, baseband processor (s), processor(s) associated with communication circuitry 329 or 330, processors associated with various core network elements, etc., among various possibilities) may cause a UE, network element, and/or BS to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

A UE 106 may establish communication with a network 100 (1102), according to some embodiments. The communication may occur via any number of TRPs, e.g., any number of BS 102. It will be appreciated that multiple TRPs may be controlled or coordinated by a single network element of network 100 (e.g., an element of a core network 606 or 600, or of a radio access network (RAN) such as a BS 102). In some examples, the TRPs may be associated with the same cell, where the physical cell ID for the TRPs are the same. In some examples, the TRPs may be associated with different cells, where the physical cell ID for the TRPs could be different. In some examples, one TRP may be a macro cell while another TRP may be a small cell. One or more TRP may operate according to any of various wireless standards and/or use any combination of frequency resources. For example, one TRP may be associated with licensed access and another TRP may be associated with unlicensed access. The various TRPs/BS 102s may be associated with different CORESETs. For example, a first BS 102 may use resources of CORESET-poolIndex=0 while a second BS 102 may use resources of CORESET-poolIndex=1. Additional BS 102s may be associated with additional CORESET-poolIndex values. The UE and network may exchange data and/or control information in the uplink and/or downlink directions via the BS 102(s).

The network 100 may cause one or more of the BS 102s to transmit control information to the UE 106 which may receive the control information (1104), according to some embodiments. The control information may be transmitted by one or more of the BS 102s. The control information may use one or more CORESETs. The control information may schedule one or more uplink transmissions (e.g., of data and/or control information using PUSCH and/or PUCCH) to one or more of the BS 102s. For example, the control information may include an uplink grant to configure one or more uplink transmissions. Any number of grants may be included.

The control information may also include one or more TPC commands associated with the uplink transmissions, e.g., to indicate the transmission power level(s) selected by the network for the uplink transmission(s). For example, a first message of the control information may schedule a first uplink transmission, and the first message and/or one or more other messages may include TPC commands setting and/or adjusting a transmit power associated with the first uplink transmission. Any other messages including TPC commands associated with the first uplink transmission may be transmitted before, concurrently with, and/or after, the first message. Different TPC commands may apply to different uplink transmissions. For example, a TPC command may apply to all subsequent uplink transmissions, uplink transmissions only of a particular type or types (e.g., associated with a particular CORESET-poolIndex value(s)), or uplink transmissions during a particular time period or periods.

In some embodiments, a TPC command may include an identifier of a BS 102 and/or TRP associated with the command. Such an identifier may be useable to determine transmissions (e.g., to the identified BS and/or TRP) to which the TPC command is applicable and to determine transmissions (e.g., to a different BS and/or TRP) to which the TPC command is not applicable.

The TPC commands and/or uplink grants may be transmitted by the network and/or received by the UE in an out-of-order manner, e.g., out-of-order scheduling may apply. For example, PDCCH (e.g., including DCI such as an uplink grant and/or TPC command) for an earlier transmission (e.g., K−1) may occur after PDCCH for a later uplink transmission (e.g., K).

In some embodiments, the control information may include an indicator of one or more active power control schemes, e.g., for closed-loop uplink power control of scheduled uplink transmissions. For example, the control information may indicate one or more of the power control schemes discussed further below with respect to 1106. In some embodiments, such a scheme may be used for the duration of a connection; in other embodiments the network may select a different scheme from time to time (e.g., in response to motion of the UE, changing network conditions, and/or other factors). In some embodiments, the UE may indicate a preference for one or more schemes, and the network may consider such a preference in selecting a scheme, e.g., or may apply the scheme(s) indicated by the UE. In some embodiments, a scheme may be standardized or otherwise preconfigured, e.g., no indicator may be used.

A network element of the network 100 may configure the control information (e.g., according to an active power control scheme) so that the UE interprets the control information to determine transmission power levels selected by the network. For example, based on uplink control information and/or measurements of uplink transmissions, the network may determine transmission power levels for one or more scheduled uplink transmissions. The network may use control information (e.g., in any number of TPC commands and/or other messages) to encode the determined power levels. For example, the network element may configure a series of TPC commands to indicate respective transmission power levels for a series of respective uplink transmissions. The number of TPC commands of the series of TPC commands may be the same or different as the number of transmission of the series of uplink transmissions. It will be appreciated that different uplink transmissions may be associated with the same or different determined power levels. For example, transmissions to two different base stations may have different (or the same) power levels based on different measured channel conditions, distance to the UE, etc. Similarly, transmissions to a particular base station may be configured with varying transmit power levels based on changing conditions. The network element may consider previous and/or planned TPC commands (e.g., using one or more CORESET-poolIndex values, according to an active power control scheme) in determining a TPC command in order to indicate a determined transmission level for a particular transmission. The network element may consider relative timing of the various TPC commands, e.g., including known or expected preparation delay of the UE for applying TPC and/or other DCI.

Based on the received control information, the UE 106 may determine transmit power for one or more uplink transmissions to one or more BS 102 (1106), according to some embodiments. The UE may (e.g., selectively) consider control information received at any combination of times and/or from any one or more of the BS 102(s) using any CORESET(s). The UE 106 may apply any of the power control schemes discussed below, e.g., as standardized and/or as indicated by the control information. Further, the UE may consider the transmission power used for a previous transmission to a BS 102 in determining the transmit power to use for a next transmission to the BS 102. For example, in some cases, one or more TPC commands included in the control information may be interpreted as adjustments relative to previously used transmission power. As further described below, the UE may use any of the power control schemes to determine which portions of the control information may apply to determining the transmit power for any particular uplink transmission. For example, some, all, or none of the TPC commands received during any particular time period may apply to a given uplink transmission. In other words, the UE may determine which one or more TPC commands of a plurality of TPC commands apply to an uplink transmission and/or the UE may determine which one or more TPC commands of the plurality of TPC commands do not apply to the uplink transmission (e.g., the UE may determine a subset of the TPC commands to include and a subset of the TPC commands to exclude from consideration for determining uplink power of a transmission). In order to determine which TPC commands to include and which TPC commands to exclude, the UE may consider factors such as resource information of the TPC command(s) such as CORESET-poolIndex (e.g., the UE may compare a CORESET-poolIndex of an uplink transmission to the CORESET-poolIndex values of TPC commands; TPC commands associated with a same CORESET-poolIndex as a particular uplink transmission may be included in determining transmit power for that transmission), timing (e.g., TPC commands received in some time periods may be included while other time periods may be excluded), etc. For example, the UE may determine a first subset of TPC commands (e.g., possibly in combination with a prior transmission power level) to apply to determine a transmission power level for a first transmission and may determine a second subset of TPC commands (e.g., possibly in combination with a same or different prior transmission power level) to apply to determine a transmission power level for a second transmission. The first and second subsets may be the same, may overlap, or may not overlap.

According to a first power control scheme, a PUCCH/PUSCH associated with respective CORESET-poolIndex should be configured with a corresponding respective closed-loop power control process index. In other words, different CORESET-poolIndex values may be associated with different closed-loop power control processes. Thus, the closed-loop power control for different closed-loop power control process index values may be maintained independently. For example, transmission to different base stations (associated with different CORESET-poolIndex values) may be handled as independent closed-loop power control processes. In other words, to determine transmission power for a next transmission using a first CORESET-poolIndex value, only the TPC commands associated with the first CORESET-poolIndex value may be considered. For the out-of-order scheduling from PDCCH from different CORESETs with different CORESET-poolIndex values, the TPC command(s) using the first CORESET-poolIndex value should not be taken into account. An example of this scheme is further illustrated in FIG. 12. In some embodiments, respective identifiers of respective TRPs and/or BSs associated with respective TPCs may be used to perform independent closed-loop power control processes for the respective TRPs and/or BSs.

Figure 12:
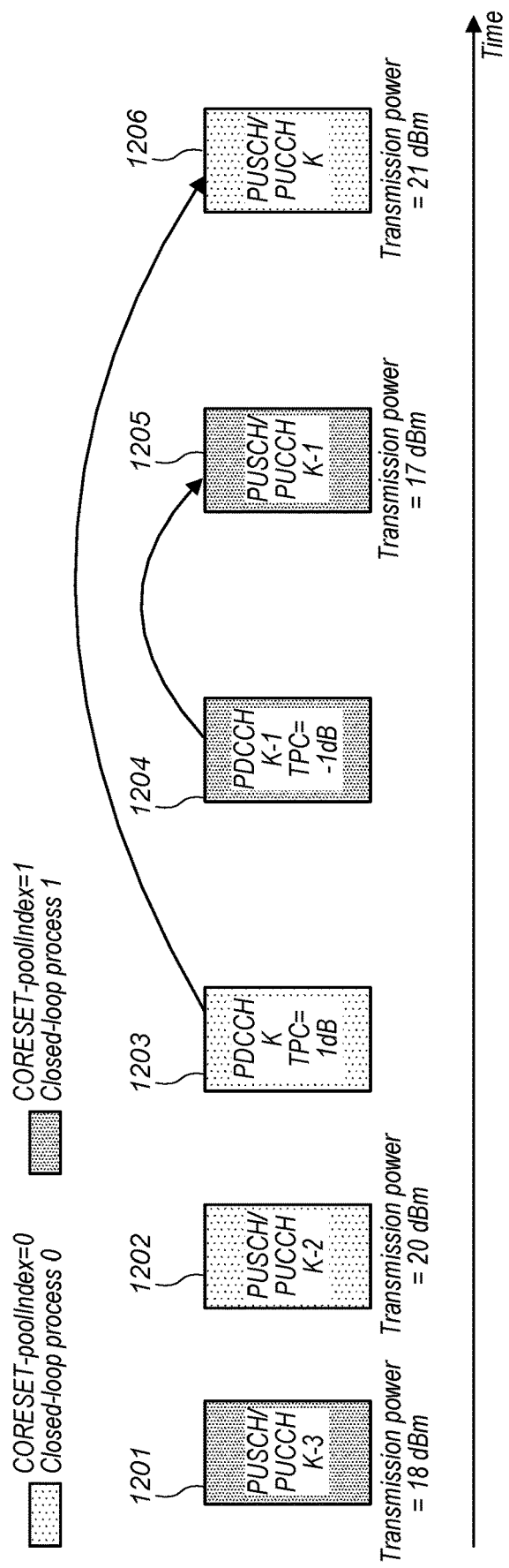

As shown in FIG. 12, transmissions 1202, 1203, and 1206 may be associated with a first CORESET-poolIndex value 0 and transmissions 1201, 1204, and 1205 may be associated with a second CORESET-poolIndex value 1. The transmissions associated with CORESET-poolIndex value 0 may be part of a first closed-loop process 0 and the transmissions associated with CORESET-poolIndex value 1 may be part of a second closed-loop process 1. For the second closed-loop process 1, transmission power may start at 18 dBM for the PUSCH and/or PUCCH transmission at slot K−3 (1201), be decreased by 1 dB by TPC received in PDCCH for slot K−1 (1204), and therefore a transmission power of 17 dBm may be determined for the PUSCH and/or PUCCH transmission at slot K−1 (1205). Note that the TPC of 1203 (e.g., or TPC of any other closed-loop process/CORESET-poolIndex) may not be considered. Similarly, for the first closed-loop process 0, transmission power may start at 20 dBM for the PUSCH and/or PUCCH transmission at slot K−2 (1202), be increased by 1 dB by TPC received in PDCCH for slot K (1203), and therefore a transmission power of 21 dBm may be determined for the PUSCH and/or PUCCH transmission at slot K (1206). Note that the TPC of 1203 may not be considered.

According to a second power control scheme, determining the accumulative power control factor for a PUCCH/PUSCH transmission may be based only on the DCI (e.g., TPC) that is transmitted from the CORESET with the same CORESET-poolIndex as that associated with the PUCCH/PUSCH. For types of uplink transmissions that are not directly associated with a CORESET-poolIndex (e.g., configured-grant based PUSCH, Msg3, and MsgA; note that Msg3 and MsgA may be uplink transmissions performed during random access), uplink transmit power may be determined based on TPC associated with a default or specified CORESET-poolIndex, e.g., CORESET-poolIndex 0, among various possibilities. Dynamic-grant based PUSCH may be associated with the CORESET-poolIndex for the CORESET carrying its scheduling PDCCH. In some embodiments, an identifier of a BS 102 and/or TRP associated with the respective TPC commands may be used to group the TPC commands into different groups/subsets, and the different groups/subsets may be applied to the respective BS and/or TRP. An example of this scheme is further illustrated in FIG. 13.

Figure 13:
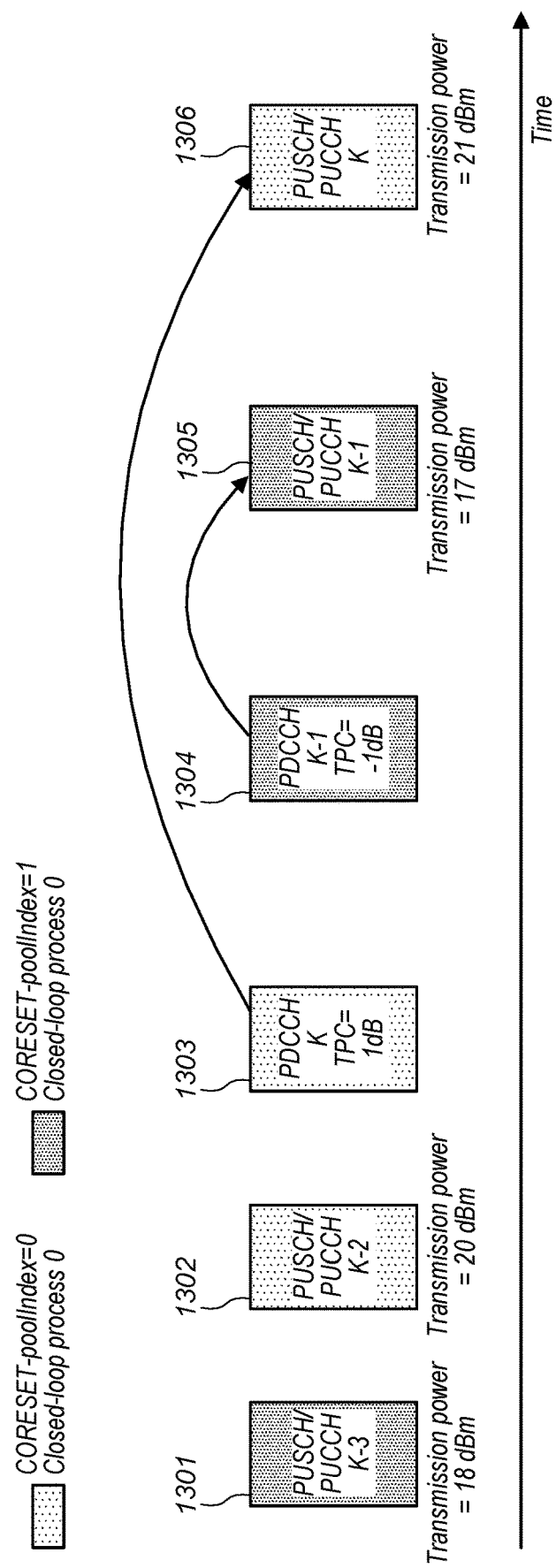

As shown in FIG. 13, transmissions 1302, 1303, and 1306 may be associated with a first CORESET-poolIndex value 0 and transmissions 1301, 1304, and 1305 may be associated with a second CORESET-poolIndex value 1. All of the illustrated transmissions (e.g., associated with either CORESET-poolIndex value) may be part of a same closed-loop process 0; e.g., there may not be separate processes for the separate CORESET-poolIndex values. However, the two CORESET-poolIndex values may be handled separately. For each closed-loop power control process, UE may maintain the closed-loop transmission power offset for uplink signal associated with different CORESET-poolIndex independently. Therefore, one closed-loop power control process may be divided into several sub-processes. The BS 102(s) may also configure different closed-loop power control processes for different other purposes, e.g. different processes (or sub-processes) for different service types (e.g., eMBB, URLLC, etc.). Thus, for CORESET-poolIndex 1, transmission power may be 18 dBm in 1301, decreased by 1 dB in 1304, and a transmit power of 17 dBm may be applied for the transmission of 1305. Similarly, for CORESET-poolIndex 0, transmission power may be 20 dBm in 1302, increased by 1 dB in 1303, and a transmit power of 21 dBm may be applied for the transmission of 1306.

According to a third power control scheme, determining the accumulative power control factor for a PUCCH/PUSCH transmission occasion K in slot n may be based only on the DCI (e.g., TPC) that is transmitted in a window, e.g., before slot n−x and after the slot n0−x−1. The parameter x may indicate a scheduling offset between the last symbol of a scheduling PDCCH and a first symbol of a dynamic-grant based PUSCH/PUCCH corresponding to the scheduling PDCHH (e.g., the number of symbols from a PDCCH with a grant to an uplink transmission scheduled by the grant). In other words, x may indicate the preparation delay. The value of x may be predefined and/or determined based on the subcarrier spacing of the PUSCH/PUCCH. It will be appreciated that the value of x may be different for different types of uplink transmissions. For example, for configured-grant based PUSCH, dynamic grant based PUSCH, and/or periodic/semi-persistent PUCCH may be associated with different values of x. In some embodiments, the value of x may be different for different CORESET poolIndex values. The parameter n0 may indicate a slot that includes PUSCH/PUCCH transmission occasion K−1.

In other words, the window for included TPC commands for a current transmission occasion K may begin with a time period associated with control information for a (e.g., immediately) previous transmission occasion (e.g., occasion K−1, e.g., including any preparation delay between DCI and uplink transmission) and end with a time period associated with control information for the current transmission occasion (e.g., including any preparation delay between DCI and uplink transmission), according to some embodiments. It will be appreciated that the window may be configured for different lengths, e.g., it may begin with a time period associated with control information for an earlier uplink occasion (e.g., K−2, etc.), according to some embodiments.

In some embodiments, in this third scheme, for transmission occasion K, only the TPC command(s) for transmission occasion K and before may be considered. So, for transmission occasion K−1, the TPC command(s) of PDCCH for transmission occasion K may not be included. An example of this scheme is further illustrated in FIG. 14.

Figure 14:
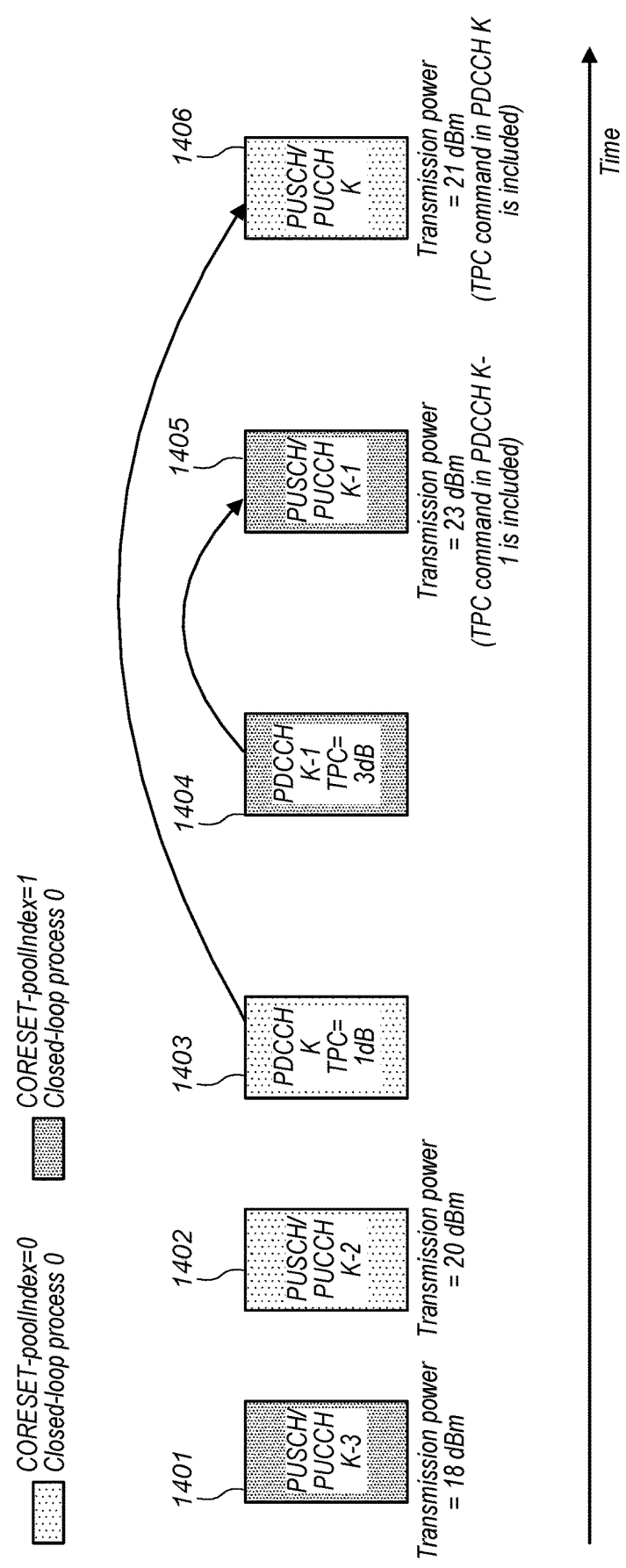

As shown in FIG. 14, transmissions 1402, 1403, and 1406 may be associated with a first CORESET-poolIndex value 0 and transmissions 1401, 1404, and 1405 may be associated with a second CORESET-poolIndex value 1. All of the illustrated transmissions (e.g., associated with either CORESET-poolIndex value) may be part of a same closed-loop process 0; e.g., there may not be separate processes for the separate CORESET-poolIndex values. Thus, for CORESET-poolIndex 1, transmission power may be 18 dBm in 1401. In 1402, a transmit power of 20 dBm may be used for CORESET-poolIndex 0, which may set the transmission power for CORESET-poolIndex 1 to 20 dBm. The transmit power may be increased by 3 dB in 1404, and a transmit power of 23 dBm may be applied for the transmission of 1405. Note that while both 1403 and 1404 may occur in the window defined by slot n−x and the slot n0−x−1, the PDCCH of 1403 applies to occasion K, which is after occasion K−1. Accordingly, TPC for occasion K, such as 1403 may not be considered for uplink occasion K−1, such as 1405. Similarly, for CORESET-poolIndex 0, transmission power may be 20 dBm in 1402, increased by 1 dB in 1403, and a transmit power of 21 dBm may be applied for the transmission of 1406. The TPC of 1404 may not be considered, e.g., because it is after the window (e.g., 1404 is not before slot n-x, e.g., the last time slot for TPC for transmit occasion K in 1406 may be the PDCCH associated with occasion K in 1403).

According to a fourth power control scheme, any TPC received for an uplink occasion (e.g., K−1, etc.) before a particular uplink occasion K may be considered in determining the power level for uplink occasion K. For example, if a second scheduling PDCCH for PUSCH/PUCCH transmission occasion K−1 is after the first scheduling PDCCH of the PUSCH/PUCCH transmission occasion K, the TPC command in the second scheduling PDCCH may be included (e.g., in addition to previously received TPC) to determine the closed-loop power control factor for occasion K. An example of this scheme is further illustrated in FIG. 15.

Figure 15:
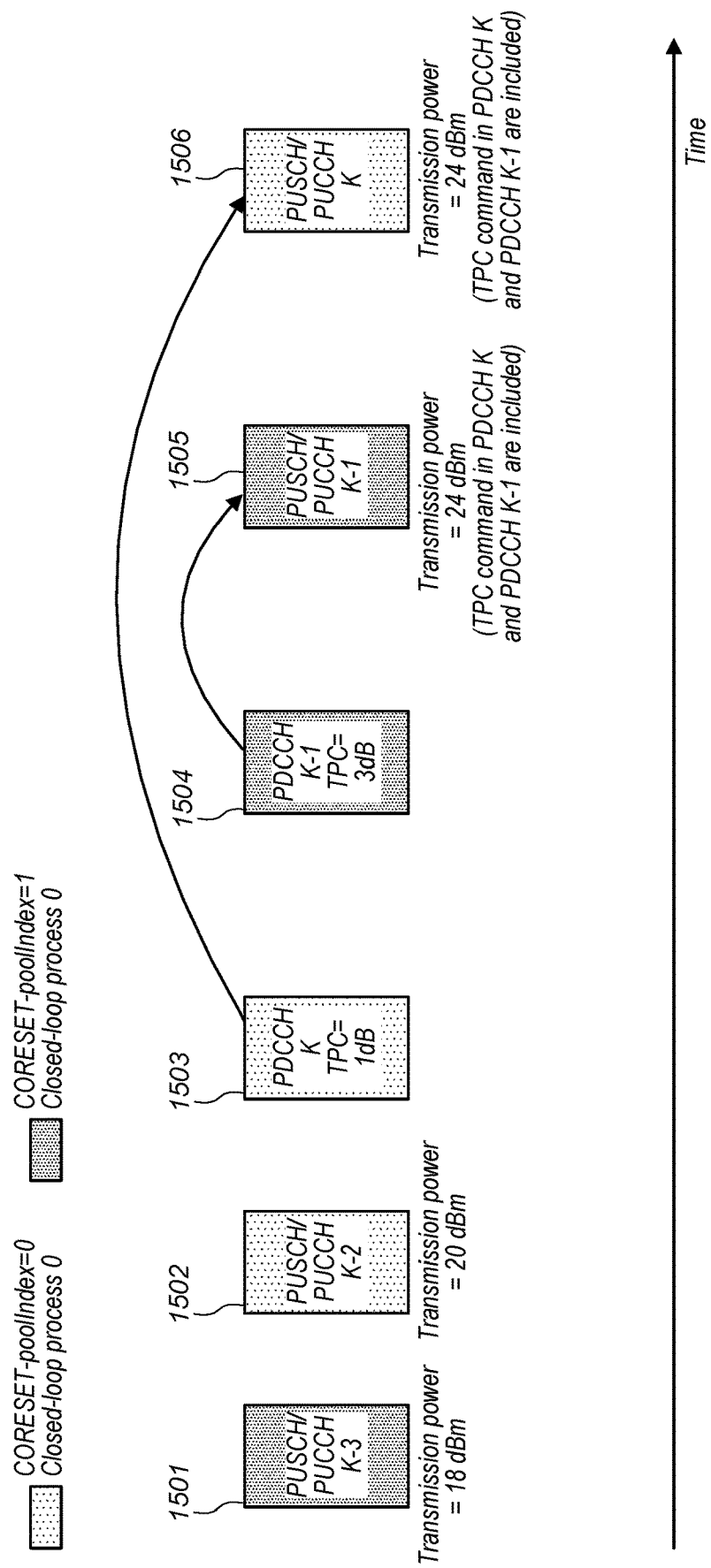

As shown in FIG. 15, transmissions 1502, 1503, and 1506 may be associated with a first CORESET-poolIndex value 0 and transmissions 1501, 1504, and 1505 may be associated with a second CORESET-poolIndex value 1. All of the illustrated transmissions (e.g., associated with either CORESET-poolIndex value) may be part of a same closed-loop process 0; e.g., there may not be separate processes for the separate CORESET-poolIndex values. Thus, for CORESET-poolIndex 1, transmission power may be 18 dBm in 1501. In 1502, a transmit power of 20 dBm may be used for CORESET-poolIndex 0, which may set the transmission power for CORESET-poolIndex 1 to 20 dBm. The transmit power may be increased by 1 dB in 1503 and 3 dB in 1504 (e.g., both 1503 and 1504 may occur before occasion K−1 in 1505), and a transmit power of 24 dBm may be applied for the transmission of 1505. Similarly, for CORESET-poolIndex 0, transmission power may be 20 dBm in 1502, increased by 1 dB in 1503 and 3 dB in 1504 (e.g., both 1503 and 1504 may occur before occasion K in 1506), and a transmit power of 24 dBm may be applied for the transmission of 1506. It will be appreciated that since no TPC is received between 1505 and 1506, the same transmission power is used for occasions K−1 and K.

According to a fifth power control scheme, accumulative closed-loop power control may be disabled if out-of-order scheduling is applied for multi-DCI based multi-TRP operation. In other words, if multiple BS 102s provide separate DCI, then open-loop power control may be used. For example, for a UE that only supports 1 closed-loop power control process or if only 1 closed-loop power control process is configured (e.g., by a network element), then open-loop power control may be used. Accordingly, the network may determine a number of closed-loop processes that the UE supports. For example, if the UE supports two or more closed-loop processes, closed-loop power control may be used for multi-base station out-of-order scheduling. In some embodiments, a UE may provide an indication (e.g., when establishing communication with the network and/or at any later time) of the number of closed-loop power control processes that it supports.

In some embodiments, one or more of the power control schemes discussed above may be modified or adjusted. For example, aspects of two or more of the power control schemes may be combined. For example, TPC commands may be selected to determine transmission power for a particular uplink transmission based on both timing of TPC command and resource information (e.g., CORESET poolIndex value) of the TPC command. For example, TPC commands received within one time period may be considered without regard to CORESET poolIndex value, while TPC commands received in a different time period may only be considered if the CORESET poolIndex value of the TPC command corresponds to that of the uplink transmission. It will be appreciated that other combinations, modifications, or adjustments are possible.

In some embodiments, if a UE reaches a maximum or minimum transmission power (e.g., using any of the power control schemes discussed herein), the UE may not increase or decrease its transmission power (e.g., beyond such maximum or minimum values) based on a closed-loop power control factor.

The UE 106 may transmit (e.g., PUSCH and/or PUCCH) using transmit power determined for the transmission occasion(s) (1108), according to some embodiments. The UE may perform transmissions to one or more BS 102 at the same or different transmission occasions (e.g., same or different time and/or frequency) using the same or different transmission power.

In some embodiments, the UE may store the transmission power(s) used in order to determine the transmission power(s) to use for one or more subsequent transmissions (e.g., as in 1106). The UE may report the transmission power(s) used to one or more BS 102, e.g., as uplink control information.

Additional Information and Examples

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station, according to some embodiments.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
   establishing communication with a network via a plurality of base stations, wherein said communication comprises closed-loop uplink power control and unordered scheduling;
   receiving, from the network, control information including:
      a first grant scheduling a first uplink transmission to a first base station of the plurality of base stations;
      a second grant scheduling a second uplink transmission to a second base station of the plurality of base stations; and
      a plurality of transmit power control commands;
   determining a first subset of the plurality of transmit power control commands to apply to the first uplink transmission, wherein a first transmit power control command of the plurality of transmit power control commands is excluded from the first subset of the plurality of transmit power control commands based on timing of the first transmit power control command;
   determining a second subset of the plurality of transmit power control commands to apply to the second uplink transmission, wherein the second subset of the plurality of transmit power control commands is different from the first subset of the plurality of transmit power control commands;
   determining, based on the first subset of the plurality of transmit power control commands, a first transmit power for the first uplink transmission;
   determining, based on the second subset of the plurality of transmit power control commands, a second transmit power for the second uplink transmission; and
   after the determination of the first subset of the plurality of transmit power control commands and the determination of the second subset of the plurality of transmit power control commands:
      transmitting, to the first base station, the first uplink transmission using the first transmit power; and
      transmitting, to the second base station, the second uplink transmission using the second transmit power.

2. The method of claim 1, wherein at least one of the plurality of transmit power control commands is excluded from the first subset of the plurality of transmit power control commands and included in the second subset of the plurality of transmit power commands based on at least one of:
   a comparison of a control resource set (CORESET)-poolIndex value associated with the first uplink transmission to respective CORESET-poolIndex values associated with the plurality of transmit power control commands; and/or
   a comparison of a CORESET-poolIndex value associated with the second uplink transmission to the respective CORESET-poolIndex values associated with the plurality of transmit power control commands.

3. The method of claim 1, wherein the first transmit power control command is before a time period associated with control information for a previous transmission occasion.

4. The method of claim 1, wherein the first transmit power control command is after a time period associated with control information for a current transmission occasion associated with the first uplink transmission.

5. The method of claim 1, wherein a second transmit power control command of the plurality of transmit power control commands is included in the subset of the plurality of transmit power control commands based on timing of the second transmit power control command, wherein the second transmit power control command is associated with a second control resource set (CORESET) poolIndex value, different from a first CORESET-poolIndex value of the first uplink transmission.

6. The method of claim 5, wherein the second transmit power command is after the first grant.

7. The method of claim 1, wherein the second transmit power is different from the first transmit power.

8. The method of claim 1, wherein uplink transmissions to the first base station comprise a first closed-loop power control process and uplink transmissions to the second base station comprise a second closed-loop power control process, independent of the first closed-loop power control process.

9. The method of claim 1, wherein resource information of a first transmit power control command of the plurality of transmit power control commands is associated with a first control resource set (CORESET)-poolIndex value, wherein, based on the first CORESET-poolIndex value, the first transmit power command is considered in determining the first transmit power and is not considered in determining the second transmit power.

10. The method of claim 1, wherein resource information of the plurality of transmit power control commands comprises one or more control resource set (CORESET)-poolIndex values, wherein the first uplink transmission may not be directly associated with a CORESET-poolIndex value, wherein the first subset of the plurality of transmit power control commands is associated with a default CORESET-poolIndex value.

11. The method of claim 10, wherein the first uplink transmission is associated with random access.

12. The method of claim 10, wherein the second uplink transmission may be associated with a second CORESET-poolIndex value different from the default CORESET-poolIndex value, wherein the second subset of the plurality of transmit power control commands is associated with the second CORESET-poolIndex value.

13. The method of claim 12, wherein the second uplink transmission is a dynamic grant based uplink transmission.

14. An apparatus, comprising:
   a processor configured to cause a user equipment to:
      establish communication with a network via a plurality of base stations, wherein said communication comprises closed-loop uplink power control and unordered scheduling;
      receive, from the network, control information including:
         a first grant scheduling a first uplink transmission to a first base station of the plurality of base stations;
         a second grant scheduling a second uplink transmission to a second base station of the plurality of base stations; and
         a plurality of transmit power control commands;
      determine a first subset of the plurality of transmit power control commands to apply to the first uplink transmission, wherein a first transmit power control command of the plurality of transmit power control commands is excluded from the first subset of the plurality of transmit power control commands based on timing of the first transmit power control command;

determine a second subset of the plurality of transmit power control commands to apply to the second uplink transmission, wherein the second subset of the plurality of transmit power control commands is different from the first subset of the plurality of transmit power control commands;

determine, based on the first subset of the plurality of transmit power control commands, a first transmit power for the first uplink transmission;

determine, based on the second subset of the plurality of transmit power control commands, a second transmit power for the second uplink transmission; and after the determination of the first subset of the plurality of transmit power control commands and the determination of the second subset of the plurality of transmit power control commands:

transmit, to the first base station, the first uplink transmission using the first transmit power; and transmit, to the second base station, the second uplink transmission using the second transmit power.

15. The apparatus of claim 14, further comprising a radio operably coupled to the processor.

16. A user equipment (UE), comprising:
a radio; and
a processor operably coupled to the radio, wherein the radio and the processor are configured to:
establish communication with a network via a plurality of base stations, wherein said communication comprises closed-loop uplink power control and unordered scheduling;
receive, from the network, control information including:
a first grant scheduling a first uplink transmission to a first base station of the plurality of base stations;
a second grant scheduling a second uplink transmission to a second base station of the plurality of base stations; and
a plurality of transmit power control commands;
determine a first subset of the plurality of transmit power control commands to apply to the first uplink transmission, wherein a first transmit power control command of the plurality of transmit power control commands is excluded from the first subset of the plurality of transmit power control commands based on timing of the first transmit power control command;

determine a second subset of the plurality of transmit power control commands to apply to the second uplink transmission, wherein the second subset of the plurality of transmit power control commands is different from the first subset of the plurality of transmit power control commands;

determine, based on the first subset of the plurality of transmit power control commands, a first transmit power for the first uplink transmission;

determine, based on the second subset of the plurality of transmit power control commands, a second transmit power for the second uplink transmission; and after the determination of the first subset of the plurality of transmit power control commands and the determination of the second subset of the plurality of transmit power control commands:

transmit, to the first base station, the first uplink transmission using the first transmit power; and transmit, to the second base station, the second uplink transmission using the second transmit power.

17. The UE of claim 16, wherein at least one of the plurality of transmit power control commands is excluded from the first subset of the plurality of transmit power control commands and included in the second subset of the plurality of transmit power commands based on at least one of:

a comparison of a control resource set (CORESET)-poolIndex value associated with the first uplink transmission to respective CORESET-poolIndex values associated with the plurality of transmit power control commands; and/or a comparison of a CORESET-poolIndex value associated with the second uplink transmission to the respective CORESET-poolIndex values associated with the plurality of transmit power control commands.

18. The UE of claim 16, wherein the first transmit power control command is before a time period associated with control information for a previous transmission occasion.

* * * * *